United States Patent [19]
Peikin

[11] Patent Number: 4,918,851
[45] Date of Patent: Apr. 24, 1990

[54] TEMPERATURE MEASUREMENT APPARATUS FOR USE IN RECREATIONAL AND SPORTING ACTIVITIES

[76] Inventor: Aaron J. Peikin, 315 N. Wayne Ave., Wayne, Pa. 19087

[21] Appl. No.: 365,173

[22] Filed: Jun. 12, 1989

Related U.S. Application Data

[63] Continuation-in-part of Ser. No. 266,884, Nov. 3, 1988, Pat. No. 4,864,763, which is a continuation-in-part of Ser. No. 922,876, Oct. 24, 1986, Pat. No. 4,782,617.

[51] Int. Cl.⁵ .............................................. A43B 1/10
[52] U.S. Cl. .............................................. 43/1; 36/4
[58] Field of Search ................. 43/1, 18.1; 36/4; 2/2.1 R, 227

[56] References Cited

U.S. PATENT DOCUMENTS

| | | | |
|---|---|---|---|
| 3,367,319 | 2/1968 | Carter | 2/2.1 R |
| 4,117,609 | 10/1978 | Helt | 36/4 |
| 4,286,439 | 9/1981 | Pasternack | 2/2.1 R |
| 4,549,315 | 10/1985 | English et al. | 2/227 |

*Primary Examiner*—M. Jordan
*Attorney, Agent, or Firm*—William H. Murray

[57] ABSTRACT

A temperature measuring device includes a temperature sensor which is located on the foot of a wader leg. A temperature measurement display device is located on the wader torso. Selectable predetermined temperature alarm limits are included to provide visual, or audible and/or tactile alarms when the temperature measured by the temperature sensor exceeds the predetermined alarm limits.

12 Claims, 3 Drawing Sheets

TEMPERATURE MEASUREMENT APPARATUS FOR USE IN RECREATIONAL AND SPORTING ACTIVITIES

CROSS REFERENCE TO RELATED PATENT APPLICATIONS

This application is a continuation-in-part of co-pending U.S. patent application, Ser. No. 07/266,884, filed Nov. 3, 1988, issued Sept. 12, 1989 Pat. No. 4,864,763 which is a continuation-in-part of U.S. patent application Ser. No. 922,876, filed Oct. 24, 1986, now U.S. Pat. No. 4,782,617.

BACKGROUND OF THE INVENTION

This invention relates to apparatus for use by outdoors persons and more particularly to apparatus for use by fishermen desiring to measure and monitor water temperatures at pre-selected locations and depths.

It is known that fish are more active feeders when the water temperature is within a certain range. Consequently, many serious fisherman carry thermometers or other temperature measuring devices to determine when and where the fish are more likely to strike. These temperature measurement devices typically are a thermometer on the end of a string, thrown into the water while grasping the string to measure the temperature at predetermined locations and depths. This inconvenient procedure requires carrying extra gear, that is the string and thermometer; retrieving the thermometer from the pocket or other storage location, unraveling the string, throwing the thermometer into the water, letting it sink to the desired depths, retrieving it and reading the indicator, then rewinding the string and stowing again.

In addition to being inconvenient, the procedure is unsatisfactory because it is often difficult to position the thermometer at the desired location and depth and maintain it there. For example, the thermometer has a tendency to drift in swift currents, making it difficult to measure the temperature at the desired location and depth. Even if it is possible to place the thermometer in the desired location, it must remain long enough to permit the temperature reading to stabilize. Once again, this is difficult in swift currents. Finally, since the thermometer must be retrieved by winding in the string, and then returned to its storage location, this procedure entails the use of both hands, making it difficult to hold a fishing rod.

The apparatus described and claimed in the parent application overcame these difficulties by providing a water temperature measuring device in which a temperature sensor is located adjacent one end of an elongated member such as a hiking/wading staff or a fishing rod. A temperature read-out device is located in the vicinity of the other end of the elongated member. The output of the temperature sensor is coupled to the temperature read-out device by appropriate means supported in or on the elongated member.

An object of the present invention is to overcome the difficulties of the thermometer on a string by providing a water temperature measuring device in which a temperature sensor is attached to the foot of one leg of a wader and a temperature read-out device is located on the torso portion of the wader. The output of the temperature sensor is couple to the temperature read-out device by appropriate means supported in or on the leg of the wader.

Another object of the present invention to provide a water temperature measuring device of the type shown and described in this application with an alarm to indicate when temperature extremes are exceeded, or when a specific temperature is detected.

Another object of the present invention to provide the water temperature measuring device with means for providing read-out in accordance with a pre-selected scale.

Another object of the present invention to provide a water temperature measuring device with a plurality of battery sources and means for automatically turning the power sources off in order to extend their life.

These and other object of the present invention will become apparent to those skilled in the art upon consideration of the following description of the invention.

SUMMARY OF THE INVENTION

The present invention comprises a water temperature measuring device in which a temperature sensor is attached to the foot of one leg of a wader, and a temperature read-out device is located on the torso portion of the wader. The output of the temperature sensor is coupled to the temperature read-out device by appropriate means supported in or on the wader leg.

In one embodiment, the temperature sensor is a thermocouple probe inserted in a sheath mounted on the boot of a stocking-foot wader, above the heel. The temperature read-out is, for example, a light emitting diode (LED) or liquid crystal display (LCD) positioned in an external pocket on the torso of the wader. A conductive wire, connecting the temperature sensor to snap-type terminal connector, is embedded in or externally attached to the boot, and another conductive wire embedded in or externally attached to the wader leg connects the temperature read-out to a second snap-type terminal connector. A connector socket attached to the boot receives both terminal connectors to complete the circuit between sensor and read-out.

In another embodiment, the wader is a one-piece type, and the single conductive wire connects the sensor to the read-out.

The power source may be a battery, a solar power source, or a combination in which a solar power source is used to recharge a battery. The power source may be located in the read-out device pocket or elsewhere on the upper torso of the wader. In an alternate preferred embodiment, alarm limit means disposed in the read-out device enable the user to selectively set upper and lower temperature limits, whereby temperature sensed beyond these limits will cause the activation of a tactile alarm such as a vibrator, a visual alarm such a blinking light; and/or an audible alarm such as a buzzer.

In yet another alternate preferred embodiment, computer means disposed in the read-out device enable the user to automatically select between Fahrenheit temperature readings and Centigrade temperature readings.

In still a further embodiment, circuitry means is included to automatically shut off the power source within a predetermined time in order to conserve energy.

Other objects, features and advantages of the present invention will become more fully apparent from the following detailed description of the preferred embodiment, the appended claims and the accompanying drawings.

DETAILED DESCRIPTION OF THE INVENTION

Figure 1:
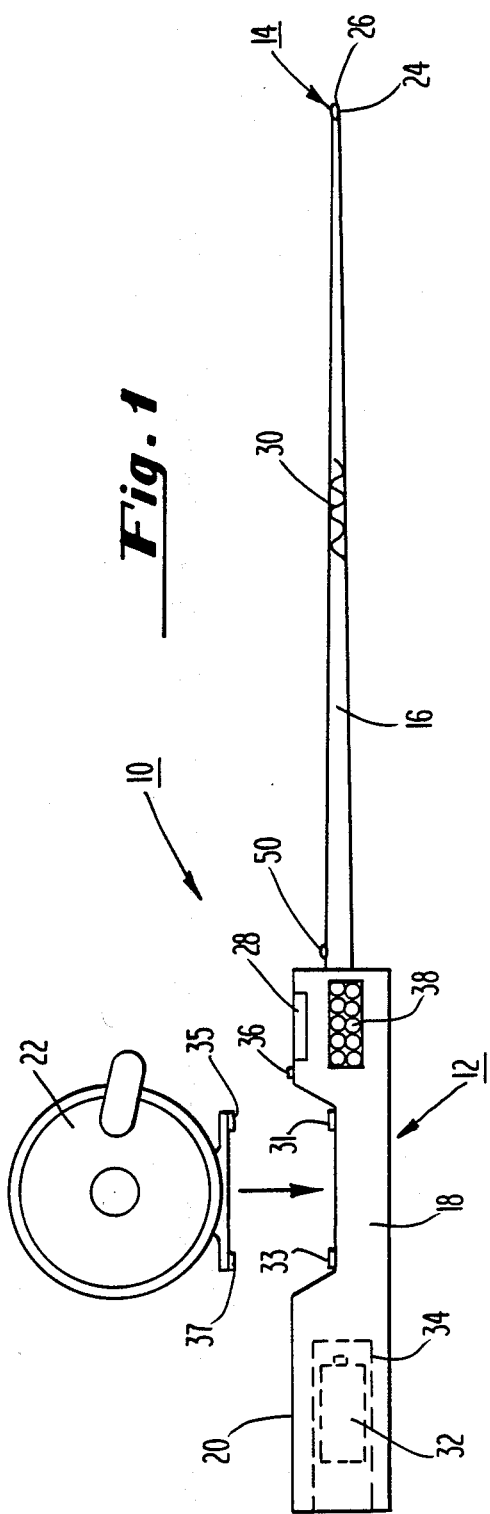
FIG. 1 is a side view of a fishing rod incorporating a temperature measurement apparatus wherein electrical connection between the temperature sensor and the read-out is made by attaching a reel to the fishing rod.

Although specific forms of the invention have been selected for illustration in the drawing, and the following description is drawn in specific terms for the purpose of describing these forms of the invention, this description is not intended to limit the scope of the invention which is defined in the appended claims.

Referring to FIG. 1, there is shown a side view of a fishing rod, generally designated 10, incorporating the temperature measurement apparatus in accordance with the present invention. The fishing rod 10 comprises a handle portion 12, a tip portion 14 and a shaft portion 16 extending between the handle portion 12 and the tip portion 1. The handle portion 12 has a grip segment 18 and a reel mounting segment 20.

A temperature measurement sensor 24 is positioned adjacent the tip portion 14 of the fishing rod 10. In the preferred embodiment, the temperature measurement sensor 24 preferably comprises a transducer which converts temperature measurements to electrical signal such as, for example, a thermocouple which is embedded in the tip 14. Alternatively, the temperature measurement sensor 24 can be mounted on the surface of the rod 16 adjacent to tip portion 14 or mounted as part of an eyelet 26 which is attached to the tip portion 14 of the fishing rod 10.

The temperature sensor 24 is electrically connected to a first set of electrical contact 31 disposed in the reel mounting segment 20 of the handle portion 12 by electrically conductive means such as, for example, wires 30 which exited along the shaft 16 of the fishing rod 10. The wires may be wrapped around and affixed to the shaft 16, embedded in the shaft or disposed in a conduit within the shaft 16. The electrically conductive means can alternately comprise carbon elements embedded in the shaft portion 16.

A second set of electrical contacts 33 are electrically connected to a read-out device 28 through appropriate electrical interface circuitry by electrically conductive means such as, for example, wires which are contained within the handle portion 12. Electrical interface circuitry required to convert the electrical signal from the temperature sensor 24 to a digital read-out format as displayed by the liquid crystal display (LCD) or light omitting diode (LED) read-out device 28 is preferably contained within the handle portion 12.

The reel 22 contains a third set of electrical contacts 35 which are electrically connected to a fourth set of electrical contact 37. The third set 35 and fourth set 37 of electrical contacts are positioned on the reel 22 such that when the reel 22 mates with the reel mounting segment 20, electrical contact is made between the first set 31 and the third set 35 of electrical contacts; and electrical contact is made between the second set 33 and further set 37 of electrical contacts. As a result, mounting the reel 22 on the reel mounting segment 20 causes electrical continuity to occur between the electrical sensor 24 and the read-out device 28 through the electrical interface circuity.

The temperature read-out 28 is preferably disposed in the grip segment 18 adjacent the shaft 16. Although this is the preferred location of the read-out 28, it should be noted that it could be disposed in any other convenient location within the grip segment 18 and still come within the scope and contemplation of the present invention. The temperature read-out device 28 is, for example, a liquid crystal (LCD) which continuously displays the temperature sensed by the temperature sensor 24. Back lighting, powered by an electrical power source, such as a battery 32 disposed in a battery compartment 34 located with the grip segment 18 is preferably provided to illuminate the LCD under low ambient light conditions The battery 32 could alternately be located in the reel 22, by which mounting of the reel on the mounting segment 20 would complete the circuitry through appropriate contracts.

The back lighting can be selectively turned on by means of a switch, for example, a push button switch 36 disposed in the grip segment 18 in a location which is conveniently operable by thumb or finger. Alternatively, the temperature read-out device can be a light emitting diode (LED) display which is powered by an electrical power source such as a battery 32 disposed within the battery compartment 34. The LED display can be selectively illuminated by activating a switch, for example the push button switch 36, disposed in the grip segment 18. It should be noted that the battery providing electrical power can be a carbon-zinc battery, a nickel cadmium, a lithium battery or other types of battery which supply electrical energy.

A solar power source 38 may be disposed in the grip segment 18 adjacent the shaft portion 16 of the rod 10. Although this is a preferred location, the solar power source can be located in any convenient location in the grip segment 18 or in the reel 22. The solar power source 38 preferably comprises at least one solar cell which converts sunlight into electrical power. Solar power source 38 can be used to power back lighting for an LCD temperature read-out device; as power for an LED display; or as power to recharge a rechargeable battery 32 disposed in the battery compartment 34 or in the reel 22. The solar power source can also be used in the dual role of supplying power to the temperature read-out device 28 as well as to recharge the battery 32.

Although the temperature sensor 24 can be used to measure ambient air temperature as well as water temperature, in an alternate preferred embodiment, a second temperature sensor 50 is disposed on the shaft portion 16 of the rod 10 adjacent the handle portion 12 for measuring air temperature. The second temperature sensor 50 is electrically connected to the read-out device 28, through the appropriate electrical interface circuitry either by direct connection or through additional sets of mating contacts in the reel mounting segment 20 and the reel 22. When the second temperature sensor 50 is connected to the read-out device 28, a switch (not shown) is preferably used to switch between the first temperature read-out device (which will typically measure water temperature at a desired location) and the second temperature sensor 50 which will measure ambient air temperature. In the alterative, the second temperatures sensor 50 can be electrically connected to its own read-out device thereby providing continuous read-out of the ambient air temperature. The second read-out device can be an LCD with selective back lighting or an LED display.

Figure 2:
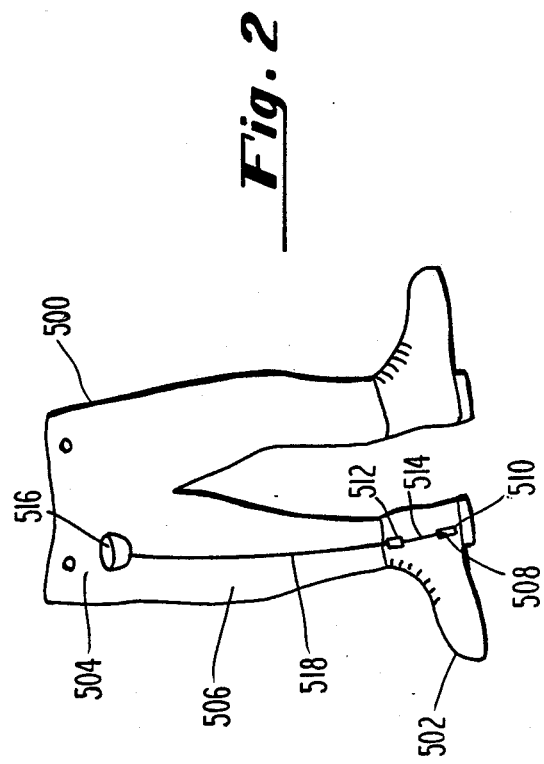
FIG. 2 is a front view of a boot wader incorporating a temperature measurement apparatus wherein the temperature sensor is in the separate boot and is coupled to the read-out wire and socket.

Referring to FIG. 2, there is shown a front view of a chest-high stocking-foot wader, generally designated 500. Such waders may alternatively be made waist-high or hip-high, and can also be of the one-piece "boot" type in which the foot section of the wader is reinforced with built-in sole, heel and side support, as opposed to the flexible watertight "stocking" used with a separate external boot. The chest-high stocking foot with separate boot wader is described hereafter in the specification and the drawing, but the corresponding features of the boot type and other height waders will be apparent.

The wader 500 comprises a boot 502, a torso portion 504, and a leg 506. A temperature measurement sensor 508, such as a thermocouple probe, is inserted in a sheath 510 mounted on the separate boot 502. The sheath 510 may be, for example a simple leather or flexible material pocket sewn to the boot 502 in this embodiment, although it would preferably be integrally molded or adhesively attached on the one-piece rubber boot style wader, which could not be sewn. A connecting socket 512 is attached to the boot 502 at the inner ankle above the sheath 510, and a conductive wire 514 with appropriate snap-type terminal connectors electrically connects the sensor 508 to one end of the socket 512. Alternatively the socket could be located on the wader leg just above the boot.

A temperature read-out device 516, of the same type as described in the previous fishing rod embodiment, or including temperature limits and visual, audible or tactile alarm as described hereinafter, is attached to the torso 504 of the wader preferably below the right front suspender button, as depicted, The read-out device 516 may be held in an external pocket of the wader or attached by velcro strips, for example. A second insulated conducting wire 518 with appropriate terminal connector, connects to the socket 512, providing an electrical signal path from sensor 508 to read-out device 516. Batteries or a solar cell may be located on or in the pocket for the read-out device. The wire 518 may alternatively be provided with an appropriate terminal connector and the read-out device 516 provided with a mating connector so that the read-out device can be removed when desired.

Figure 3:
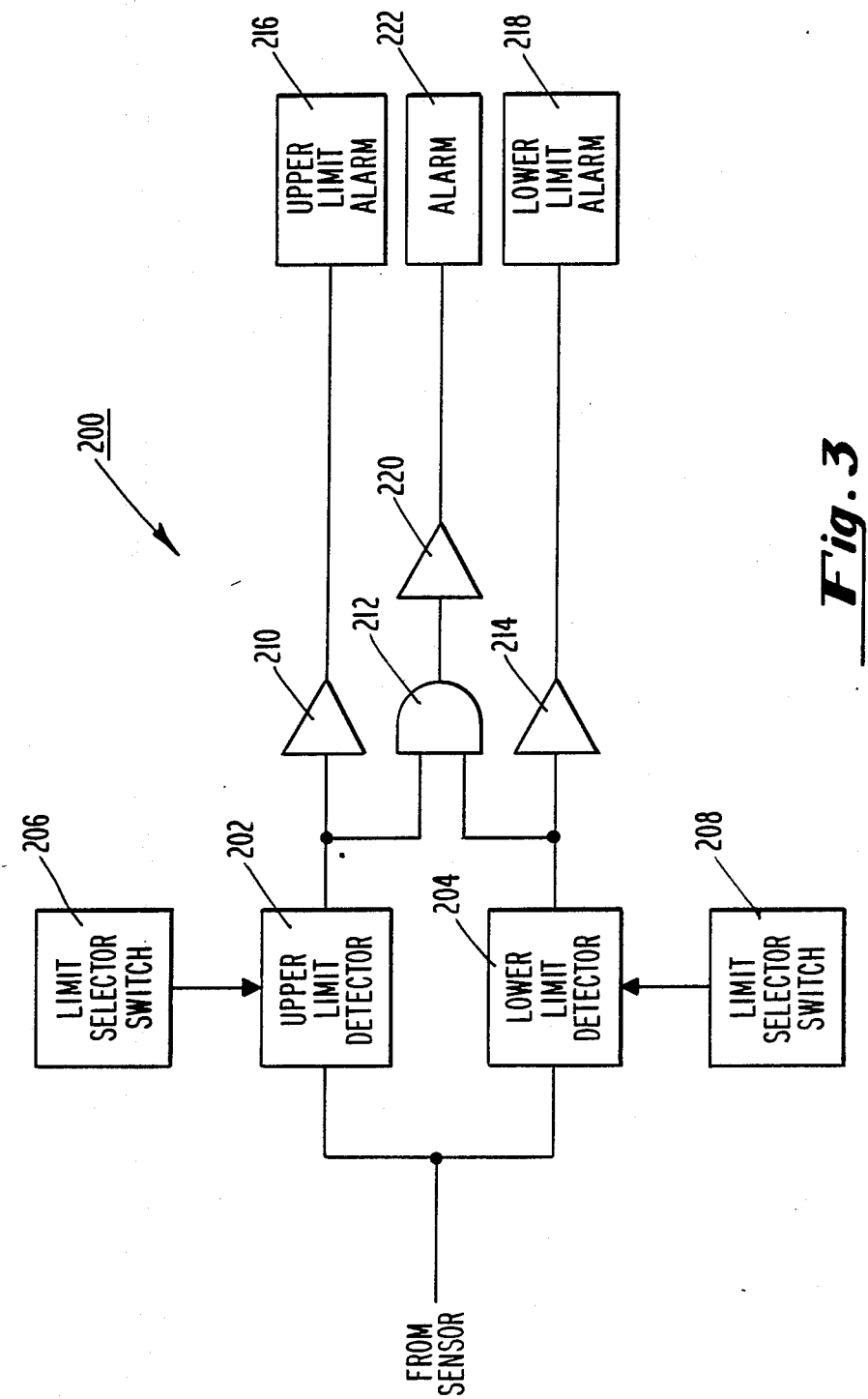
FIG. 3 is a block diagram of an apparatus for providing temperature alarms in accordance with the present invention.

Referring now to FIG. 3, there is shown a block diagram of an alarm circuit for use in connection with the temperature measurement apparatus of the present invention. The alarm circuit, generally designated 200, comprises an adjustable upper limit detector 202 and an adjustable lower limit detector 204. The adjustable upper limit detector 202 is adjusted by a first limit selector switch 206 which is preferably mounted in the handle portion 12. The adjustable lower limit detector is adjusted by a second limit selector switch 208 which is also preferably mounted in the handle portion. 12. In the preferred embodiment, each limit selector switch comprises two digit switches, one to set the units portion of the limit and one to set the tens portion of the limit whereby each limit can be adjusted from 00 to 99 degrees Fahrenheit or Centigrade.

It should be noted that in an alternate preferred embodiment the upper limit and lower limit are each set by a fast scan pushbutton switch which, when depressed, will electronically scan the available limits (for example 0° to 100° Centigrade) at a predetermined fast scan rate and will stop at a particular limit when the switch is released. Such a fast scan switch could also be augmented by a slow scan switch which, when depressed, will electronically scan the limits at a predetermined slow scan rate which is slower that the fast scan rate in order to enable the user to precisely select a predetermined limit. In this embodiment, the user would depress the fast scan switch until the approximate limit appears on the display, then get the exact limit by depressing the slow scan switch until the exact limit appears in the display.

In yet another alternate preferred embodiment, one switch is associated with the units portion of the limit while another switch is associated with the tens portion. For wider limits, there could be a third switch associated with the hundreds portion of a limit. In this embodiment, the user would set the limit by depressing the units switch until the desires units digit of the limit appears in the display; depressing the tens switch until the desired tens digit of the limit appears in the display; and if applicable, depressing the hundreds digit of the limit switch until the desired hundreds unit appears in the display. In these alternate preferred embodiments there could be a switch or set of switches for each limit or there could be a switch or set of switches with another switch to select either the upper limit or the lower limit, depending upon which limit is being programmed. In addition, the scan could either be a continuous wrap around scan that need only be advanced in a single direction, (for example, upon reaching the highest selectable limit number and continue incrementing) or it could be incremented and decremented in order to achieve the desired limit.

As shown in FIG. 3, the sensor is electrically connected to the inputs of the adjustable limit detector 202 and the adjustable lower limit detector 204. The output of the adjustable upper limit detector 202 is coupled to a first amplifier 210 and one input of a two input OR-gate 212. The output of the adjustable lower limit detector 204 is coupled to a second amplifier 214 and the second input of the two input OR-gate 212. The output of the first amplifier 210 is coupled to an upper limit alarm 216. The output of the second amplifier 214 is coupled to the input of a lower limit alarm 218. The upper and lower limit alarms can be, for example, LED's which illuminate when either the upper limit or lower limit has been reached; they may also be tone generators which generate different tones for example, a high tone when the upper limit has been reached and a lower tone when the lower tone has been reached.

The output of the OR-gate 212 is coupled to the input of a third amplifier 220. The output of the third amplifier 220 is couple to an alarm 222, for example an audible, or visual or a tactile alarm, or any combination of such alarms, will be initiated when the temperature reached either the upper limit or the lower limit.

Although FIG. 3 sets forth the alarms being triggered by reaching an upper limit or a lower limit, an alarm could also be triggered upon reaching a specific desired temperature which is set in a single set of digit switches In this way, the user can set the desired temperature by means of the digit switches then using the temperature sensor 24, probe or wade in the waters until the alarm goes off, which signifies that the temperature sensor has now reached a location at which the water is at the desired temperature. It should be noted that the alarm can be either visual, audible or tactile (for example vibration) or any combination thereof and such is to be considered within the scope and contemplation of the present invention.

Figure 4:
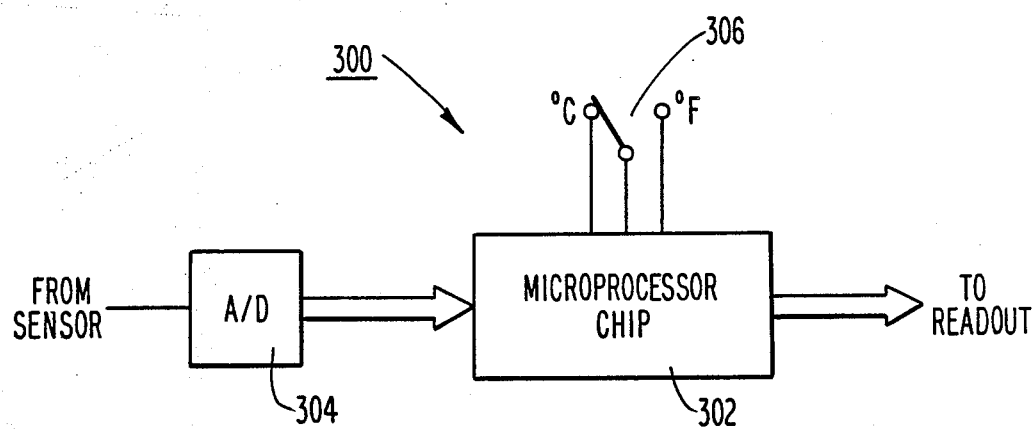
FIG. 4 is a block diagram of a Fahrenheit/Centigrade conversion apparatus for use with the temperature measuring device in accordance with the present invention.

Referring now to FIG. 4, there is shown Fahrenheit to Centigrade conversion apparatus which is generally designated 300. The conversion apparatus 300 preferably comprises a microprocessor chip 302 which is preferably mounted in the handle portion 12. The conversion apparatus also comprises an analog to digital converter 204. In this embodiment of the present invention invention, the temperature sensor 24 is electrically coupled to the analog input of the analog to digital computer 304. The digital output of the analog to digital converter 304 is coupled to data input port of the computer 302. Data output ports of the computer 3202 are coupled to the read-out device 28. A Centigrade/Fahrenheit switch 306 is connected to the computer 302. The computer 302 stores a look-up table which converts the input digital data signal to an output signal in either Fahrenheit or Centigrade depending upon the position of the switch 306 The information storage media can be a read only memor (ROM) internal to the computer; a programmable read only memory (PROM) external to the computer or a combination of such storage media or any other storage media accessible to the computer.

Figure 5:
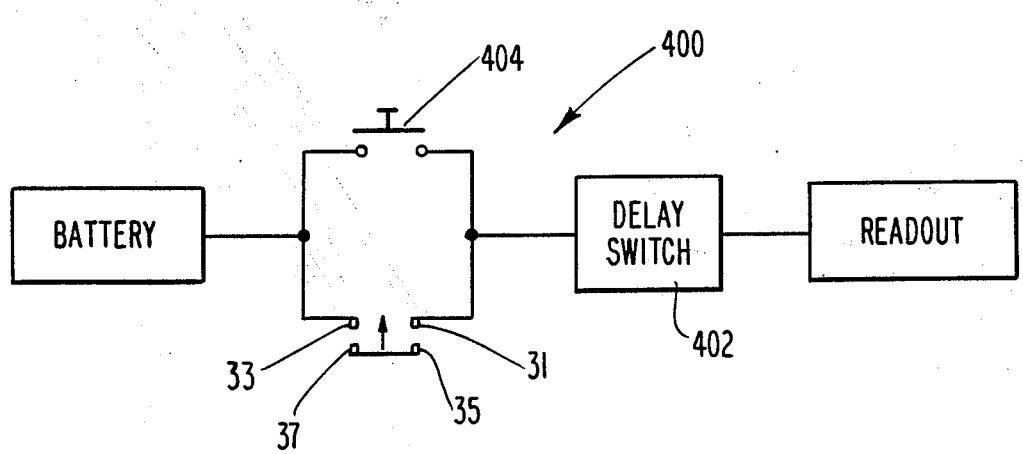
FIG. 5 is a block diagram of a power source including automatic power shut off in accordance with the present invention.

Referring now to FIG. 5, there is shown a block diagram of a battery life extension circuit designated 400. The battery life extension circuit 400 comprises a delay switch 402 which is activated by mounting the reel 22 on the reel mounting segment 20 thereby casing an electrical contact to be made between the mating contact as previously described. This causes the delay switch 402 to close for a predetermined period of time. At expiration of that predetermined time, the switch will open. This delay switch operation can also be initiated by push button 404 which is preferably mounted in the handle portion 12. Closing of the switch for the predetermined period of time will apply battery power to the read-out enabling the user to view the read-out for the predetermined period of time following which the battery is automatically disconnected. This prevents a continuous drain of electrical energy from the battery. The delay switch can be, for example, a solid state switch controlled by an R-C (resistance-capacitance) delay network as is known in the art. In the wader embodiment, such switch would preferably be mounted on the read-out device or power source.

Although various embodiments of the present invention have been previously described herein with respect to a fishing rod, all the embodiments, except that relating to the mating electrical connector means disposed in the reel adapted for muunting in the reel mounting segment of the fishing rod, are usable in the wader embodiment. The details of such embodiments, described with respect to the fishing rod, are equally applicable to the wader embodiment and the description of such details are considered to be applicable to those embodiments as if fully repeated again with respect to such embodiment.

The wader embodiment allows the user to continuously sample bottom temperature at the location he is standing. The battery life extension circuit permits the user to read the temperature sensor for a predetermined period of time following which the battery is disconnected thereby conserving battery life. The user may also measure ambient air temperature as well as water temperature and convert these reading from Fahrenheit to Centigrade as desired. The user will also be warned when the temperature exceeds predetermined limits or when the temperature reaches the desired magnitude by visual, audible or vibrating alarm indicators.

It will be understood that various changes in the details, materials and arrangement of the parts which have been herein described and illustrated in order to explain the nature of this invention may be made by those skilled in the art within the principal and scope of the invention as expressed in the following claims.

I claim:

1. A wader comprising:
   (a) at least one foot portion having disposed thereon a temperature sensing means;
   (b) a torso portion having disposed thereon a temperature measurement display means;
   (c) an electrical power source;
   (d) means for electrically interconnecting said temperature sensing means, said temperature measurement display means, and said electrical power source.

2. The wader in accordance with claim 1 additionally comprising means for selecting at least one predetermined temperature alarm limit and means for generating an alarm when the temperature sensed by said temperature sensing means exceeds said selected alarm limit.

3. The wader in accordance with claim 2 additionally comprising means for selecting a predetermined upper temperature alarm limit and a predetermined lower temperature alarm limit.

4. The wader in accordance with claim 3 additionally comprising means for generating an alarm when the temperature sensed by said temperature sensing means is above said predetermined upper temperature alarm limit and for generating an alarm when the temperature sensed by the temperature sensing means is below said predetermined lower temperature alarm limit.

5. The wader in accordance with claim 4 wherein said alarm comprises a visual alarm.

6. The wader in accordance with claim 4 wherein said alarm comprises an audible alarm.

7. The wader in accordance with claim 4 wherein said alarm comprises a tactile alarm.

8. The wader in accordance with claim 1 wherein said temperature measurement display means displays a temperature measurement which is selectable in either units of degrees Fahrenheit or degrees Centigrade.

9. The wader in accordance with claim 1 wherein said electrical power source comprises an electric storage batteryremovably disposed in a battery compartment.

10. The wader in accordance with claim 9 additionally comprising means for electrically disconnecting said power source after a predetermined time.

11. The wader in accordance with claim 10 wherein said electrical power source comprises:
   (a) a rechargeable. electrical storage battery; and
   (b) a solar power source adapted to recharge said rechargeable electric storage battery.

12. The wader in accordance with claim 11 wherein solar power source comprises at last one solar cell.

* * * * *